(12) United States Patent
Aratani

(10) Patent No.: US 11,268,648 B2
(45) Date of Patent: Mar. 8, 2022

(54) SUPPORTING PLATFORM, ROTATING MACHINE UNIT, AND METHOD FOR MANUFACTURING ROTATING MACHINE UNIT

(71) Applicant: MITSUBISHI HEAVY INDUSTRIES COMPRESSOR CORPORATION, Tokyo (JP)

(72) Inventor: Norio Aratani, Hiroshima (JP)

(73) Assignee: MITSUBISHI HEAVY INDUSTRIES COMPRESSOR CORPORATION, Tokyo (JP)

( * ) Notice: Subject to any disclaimer, the term of this patent is extended or adjusted under 35 U.S.C. 154(b) by 552 days.

(21) Appl. No.: 16/330,695

(22) PCT Filed: Sep. 14, 2016

(86) PCT No.: PCT/JP2016/077081
§ 371 (c)(1),
(2) Date: Mar. 5, 2019

(87) PCT Pub. No.: WO2018/051427
PCT Pub. Date: Mar. 22, 2018

(65) Prior Publication Data
US 2021/0301971 A1    Sep. 30, 2021

(51) Int. Cl.
*F16M 7/00* (2006.01)
*F16M 5/00* (2006.01)

(52) U.S. Cl.
CPC ............... *F16M 7/00* (2013.01); *F16M 5/00* (2013.01); *F16M 2200/08* (2013.01)

(58) Field of Classification Search
CPC ......... F16M 7/00; F16M 5/00; F16M 2200/08
See application file for complete search history.

(56) References Cited

U.S. PATENT DOCUMENTS 2,779,559 A * 1/1957 Bertuch ............... F16F 1/3615
 248/602
3,021,100 A * 2/1962 Verhota ................. F16M 7/00
 248/646

(Continued)

FOREIGN PATENT DOCUMENTS

EP           416228 A  *  3/1991
EP        1491814 A2  * 12/2004       ............... F16M 7/00

(Continued)

OTHER PUBLICATIONS

International Search Report issued in corresponding International Patent Application No. PCT/JP2016/077081, dated Nov. 15, 2016 (12 pages).

(Continued)

*Primary Examiner* — Eret C McNichols
(74) *Attorney, Agent, or Firm* — Osha Bergman Watanabe & Burton LLP

(57) ABSTRACT

A supporting platform which supports a rotating machine on a base, includes: a pair of supporting bodies which is provided on the base to be separated from each other in a horizontal direction; a supporting column which is provided on the supporting body, extends upward in a vertical direction, and supports a supporting target portion provided in the rotating machine; an outer adjustment member which supports the supporting body on the base and adjusts a height of the supporting body with respect to the base; and an inner adjustment member which is disposed inside the outer adjustment member in a separation direction of the pair of supporting bodies, supports the supporting body on the base, and adjusts the height of the supporting body with respect to the base.

11 Claims, 7 Drawing Sheets

(56) References Cited

U.S. PATENT DOCUMENTS

| | | | | |
|---|---|---|---|---|
| 3,777,442 | A * | 12/1973 | Bernu | B24B 21/12 |
| | | | | 451/303 |
| 3,805,102 | A * | 4/1974 | Vockler | H02K 1/185 |
| | | | | 310/91 |
| 3,823,451 | A * | 7/1974 | Faille | D02H 13/38 |
| | | | | 28/172.1 |
| 5,016,338 | A * | 5/1991 | Rowan, Jr. | B23Q 1/0054 |
| | | | | 264/261 |
| 5,110,082 | A * | 5/1992 | Rowan, Jr. | F16M 7/00 |
| | | | | 248/649 |
| 5,282,602 | A * | 2/1994 | Zimmermann | F16M 7/00 |
| | | | | 248/680 |
| 6,729,597 | B2 | 5/2004 | Cholinski | B66B 11/004 |
| | | | | 248/646 |
| 7,028,970 | B1 * | 4/2006 | Wiseman | F16M 5/00 |
| | | | | 108/51.11 |
| 7,082,896 | B2 * | 8/2006 | Allen | F02B 63/04 |
| | | | | 123/2 |
| 7,441,743 | B2 * | 10/2008 | Behlinger | F16M 7/00 |
| | | | | 248/679 |
| 8,037,646 | B2 * | 10/2011 | Wobben | E02D 27/42 |
| | | | | 52/126.3 |
| 8,857,781 | B2 * | 10/2014 | Wang | F02B 63/04 |
| | | | | 248/678 |
| 9,206,617 | B2 * | 12/2015 | Wobben | F03D 13/22 |
| 10,150,659 | B2 * | 12/2018 | Kuttel | F16F 15/04 |
| 10,215,327 | B2 * | 2/2019 | Goleczka | F02B 63/04 |
| 2002/0197147 | A1 * | 12/2002 | Kawai | F16M 7/00 |
| | | | | 415/1 |
| 2007/0107198 | A1 * | 5/2007 | Ol | F16M 7/00 |
| | | | | 29/525.01 |
| 2010/0095683 | A1 * | 4/2010 | Glynn | F16M 1/04 |
| | | | | 60/796 |
| 2013/0106113 | A1 * | 5/2013 | Wang | F02B 63/04 |
| | | | | 290/1 A |
| 2016/0031686 | A1 * | 2/2016 | Kuttel | F16M 7/00 |
| | | | | 166/66.4 |
| 2020/0011391 | A1 * | 1/2020 | Allen | B65G 1/02 |
| 2020/0116293 | A1 * | 4/2020 | Arimatsu | F16F 7/00 |
| 2021/0301971 | A1 * | 9/2021 | Aratani | F16M 7/00 |

FOREIGN PATENT DOCUMENTS

| | | | |
|---|---|---|---|
| JP | S54-107757 U | 7/1979 | |
| JP | S56-129694 U | 10/1981 | |
| JP | H1-284617 A | 11/1989 | |
| JP | H03271505 A | 12/1991 | |
| JP | H05-74788 U | 10/1993 | |
| JP | 2002-364309 A | 12/2002 | |
| JP | 2007-106587 A | 4/2007 | |
| WO | WO-2018051427 A1 * | 3/2018 | F04D 29/60 |

OTHER PUBLICATIONS

Written Opinion issued in corresponding International Patent Application No. PCT/JP2016/077081, dated Nov. 15, 2016 (12 pages).

* cited by examiner

SUPPORTING PLATFORM, ROTATING MACHINE UNIT, AND METHOD FOR MANUFACTURING ROTATING MACHINE UNIT

TECHNICAL FIELD

The present invention relates to a supporting platform, a rotating machine unit, and a method for manufacturing a rotating machine unit.

BACKGROUND ART

In a rotating machine such as a compressor, a turbine, or a motor, it is necessary to adjust a horizontal level of the rotating machine so that a center of a rotating shaft thereof becomes horizontal. For example, PTL 1 discloses a steam turbine installation method of adjusting a horizontal level of a base plate by a jack bolt provided at four corners of the base plate supporting a steam turbine. In this installation method, after the horizontal level is adjusted, the grout material is filled between the base plate and a base, and a load of the steam turbine is supported by the grout material.

CITATION LIST

Patent Literature

[PTL 1] Japanese Unexamined Patent Application, First Publication No.

SUMMARY OF INVENTION

Technical Problem

However, in a case where the rotating machine is placed on a supporting column provided on the base plate and is supported by the supporting column, the jack bolt is provided at a position separated horizontally from the supporting column so as not to interfere with the supporting column. As a result, an operation position of the load of the rotating machine acting on the base plate via the supporting column and a supporting position of the base plate by the jack bolt are away from each other. Therefore, the base plate may be inclined by the load of the rotating machine such that a side on which the jack bolt is not provided with respect to the supporting column sinks downward. The base plate is inclined, and thus, the supporting column supporting the rotating machine is inclined, and a gap is generated between the rotating machine and an upper end surface of the supporting column. Accordingly, there is a demand to install the rotating machine with high accuracy.

The present invention provides a supporting platform, a rotating machine unit, and a method for manufacturing a rotating machine unit capable of installing a rotating machine with high accuracy.

Solution to Problem

According to a first aspect of the present invention, a supporting platform is provided which supports a rotating machine on a base, including: a pair of supporting bodies which is provided on the base to be separated from each other in a horizontal direction; a supporting column which is provided on the supporting body, extends upward in a vertical direction, and supports a supporting target portion provided in the rotating machine; an outer adjustment member which supports the supporting body on the base and adjusts a height of the supporting body with respect to the base; and an inner adjustment member which is disposed inside the outer adjustment member in a separation direction of the pair of supporting bodies, supports the supporting body on the base, and adjusts the height of the supporting body with respect to the base, in which the supporting body includes an upper plate section to which the supporting column is fixed, a lower plate section which is provided below the upper plate section in the vertical direction at an interval, and a connection section which is provided at a position overlapping the supporting column when viewed in the vertical direction and connects the upper plate section and the lower plate section to each other, the outer adjustment member is disposed outside the connection section in the separation direction, and the inner adjustment member is disposed inside the connection section in the separation direction.

According to this configuration, a load of the rotating machine applied to the upper plate section via a position at which the supporting column is provided separately acts on the outer adjustment member and the inner adjustment member. Accordingly, by the outer adjustment member and the inner adjustment member, it is possible to support the upper plate section on which the load acts from both sides in the separation direction with respect to the supporting column. Therefore, it is possible to prevent the upper plate section from being inclined by the load of the rotating machine without increasing stiffness of the upper plate section. Moreover, it is possible to easily perform a height adjustment and a level adjustment of each supporting body with high accuracy by the outer adjustment member and the inner adjustment member.

In the supporting platform according to a second aspect of the present invention, in the first aspect, the inner adjustment member may include an inner operating portion for adjusting the height of the supporting body, and the inner operating portion may be provided above the upper plate section in the vertical direction.

According to this configuration, the inner adjustment member is exposed above the upper plate section. Accordingly, in a case where the height of the supporting body is adjusted by the inner adjustment member, it is possible to easily operate the inner adjustment member positioned inside the connection section.

In the supporting platform according to a third aspect of the present invention, in a first aspect or the second aspect, the inner adjustment member is provided at a position where a position of the rotating machine in an axial direction in which a rotating shaft extends overlaps the supporting column.

According to this configuration, the load of the rotating machine received by the supporting column can be accurately received by the portion supported by the inner adjustment member. As a result, it is possible to accurately prevent the supporting body from being inclined.

In the supporting platform according to a fourth aspect of the present invention, in any one of the first to third aspects, the supporting body may include a first square tubular member having a rectangular tubular shape and a second square tubular member which is disposed inside the first square tubular member in the separation direction and has a rectangular tubular shape, the connection section may include mutually facing side wall portions of the first square tubular member and the second square tubular member, the outer adjustment member may support the first square tubular member, and the inner adjustment member may support the second square tubular member.

According to this configuration, it is possible to form the supporting body by a member such as a square tubular steel material. Therefore, it is possible to manufacture the supporting platform while decreasing costs.

In the supporting platform according to a fifth aspect of the present invention, in the fourth aspect, the outer adjustment member may include an outer operating portion for adjusting the height of the supporting body, the first square tubular member may include an opening portion which is formed on the side wall portion facing the outside in the separation direction, and the outer operating portion may be provided inside the first square tubular member which communicates with the outside via the opening portion.

In the supporting platform according to a sixth aspect of the present invention, in any one of the first to fifth aspects, a portion between the lower plate section and the base may be filled with a curable filler.

According to the configuration, it is possible to fix the position of the supporting body with respect to the base by the curable filler together with the outer adjustment member and the inner adjustment member.

According to a seventh aspect of the present invention, a rotating machine unit is provided, including: the supporting platform according to any one of the first to sixth aspects; and a rotating machine having a supporting target portion which is supported on a supporting column of the supporting platform.

According to an eighth aspect of the present invention, a method for manufacturing the rotating machine unit according to the seventh aspect is provided, including: a step of installing the rotating machine on the supporting column; a step of adjusting a height position of the upper plate section with respect to the base in the vertical direction by the outer adjustment member and the inner adjustment member; a step of fixing a position of the supporting platform with respect to the base by an anchor member; and a step of filling a portion between the lower plate section and the base with a curable filler after the position of the supporting platform is fixed.

Advantageous Effects of Invention

According to the present invention, it is possible to install a rotating machine with high accuracy.

DESCRIPTION OF EMBODIMENTS

Figure 1:
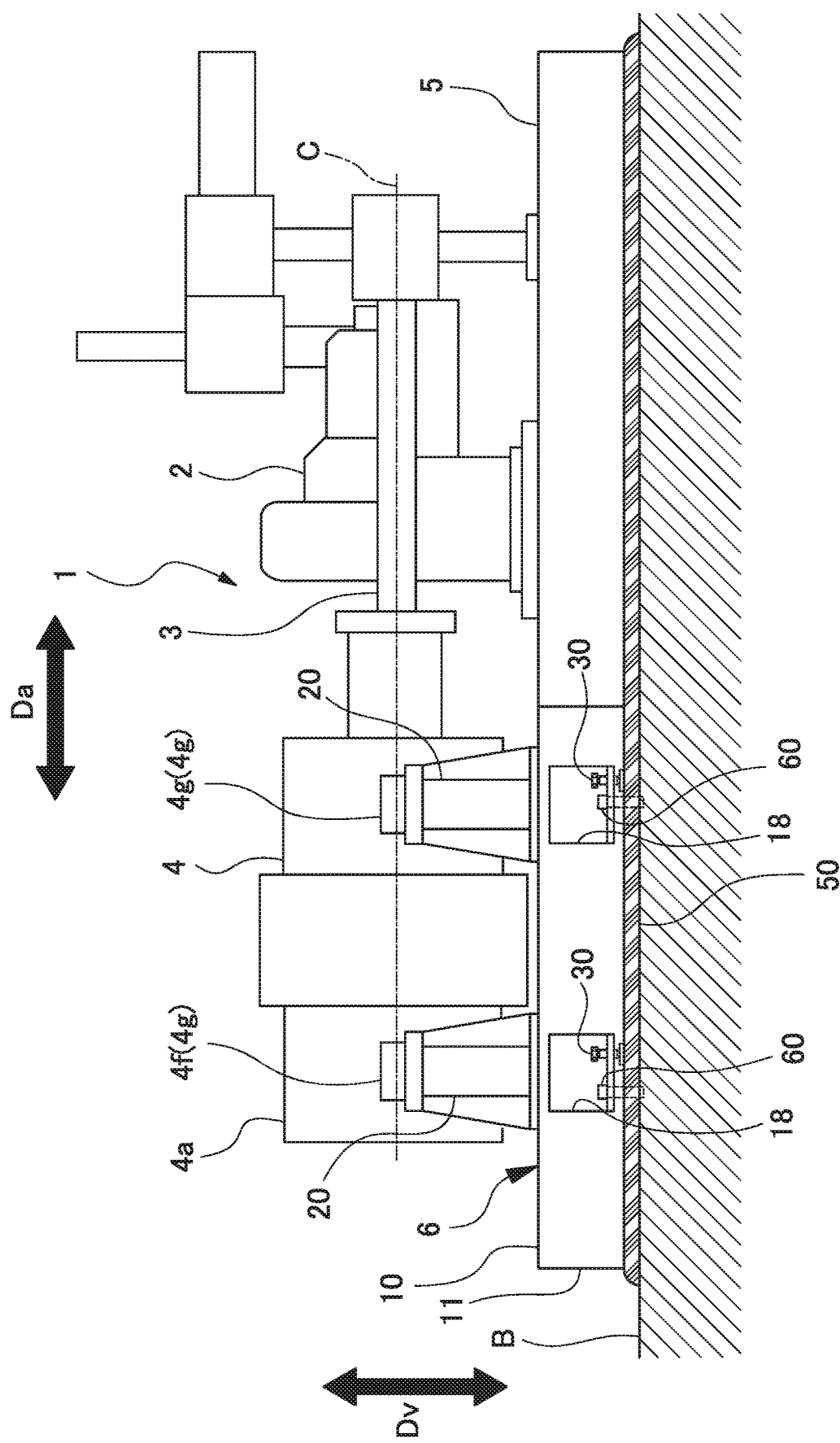
FIG. 1 is a side view of a compressor system in an embodiment of the present invention.
Figure 2:
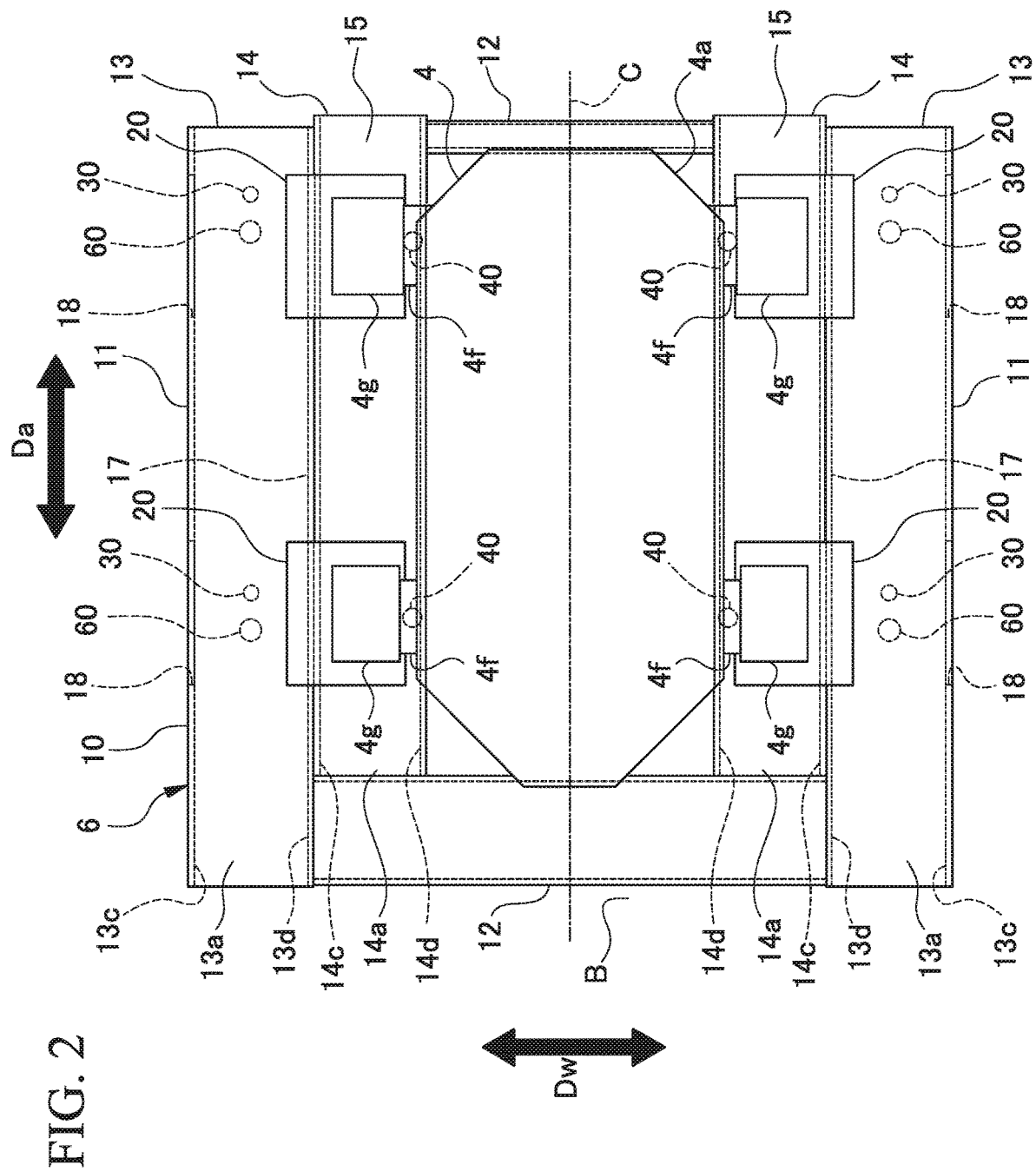
FIG. 2 is a plan view showing a compressor and a supporting platform thereof constituting the compressor system in the embodiment of the present invention.
Figure 3:
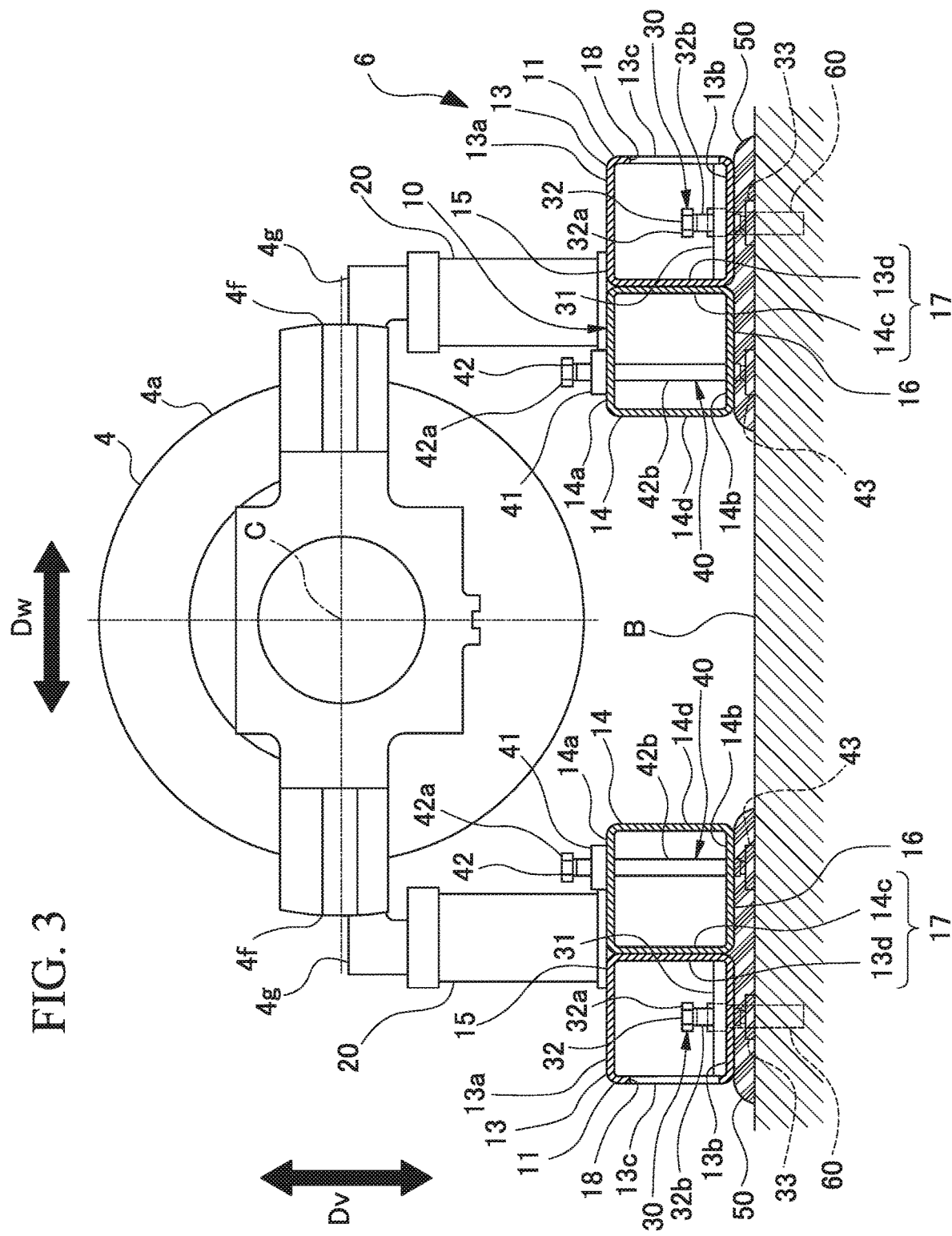
FIG. 3 is a sectional view orthogonal to a rotating shaft of the compressor in the embodiment of the present invention.

FIG. 1 is a side view of a compressor system in an embodiment of the present invention. FIG. 2 is a plan view showing a compressor and a supporting platform thereof constituting the compressor system in the embodiment of the present invention. FIG. 3 is a sectional view orthogonal to a rotating shaft of the compressor in the embodiment of the present invention.

As shown in FIG. 1, a compressor system (rotating machine unit) 1 includes a driving machine 2 which generates power, a drive shaft 3, a compressor (rotating machine) 4, and supporting platforms 5 and 6.

The driving machine 2 rotationally drives the drive shaft 3 around a central axis C of the drive shaft 3. The driving machine 2 is placed on the supporting platform 5.

The rotation of the drive shaft 3 is transmitted to the compressor 4, and a rotating shaft (not shown) rotates. The rotating shaft rotates, and thus, the compressor 4 compresses a fluid flowing through a flow path provided in the compressor 4. Here, a speed reducer or a speed increaser may be interposed between the drive shaft 3 and the rotating shaft of the compressor 4.

The driving machine 2 and the compressor 4 are installed via the supporting platforms 5 and 6 in a state where the drive shaft 3 and the rotating shaft are connected to each other on a base B.

As shown in FIGS. 1 to 3, the supporting platform 6 supports the compressor 4 on the base B. The supporting platform 6 includes as a support frame 10, supporting columns 20, outer jack members (outer adjustment members) 30, inner jack members (inner adjustment members) 40, a grout material (curable filler) 50, and anchor members 60.

As shown in FIG. 2, the support frame 10 is formed in a rectangular frame shape in plan view when viewed from above in a vertical direction Dv. The support frame 10 includes a pair of main frame portions (supporting bodies) 11 and a pair of connection portions 12.

The pair of main frame portions 11 is disposed on the base B. The pair of main frame portions 11 is provided to be separated from each other in a horizontal direction.

The pair of the main frame portions 11 of the present embodiment is provided at an interval in a width direction (separation direction) Dw of the compressor 4 orthogonal to an axial direction Da in the horizontal direction. The pair of main frame portions 11 is disposed such that a central axis C is interposed therebetween at a center in the width direction Dw. Each main frame portion 11 extends in the axial direction Da.

Here, the axial direction Da is a direction in which the rotating shaft (not shown) of the compressor 4 extends in the horizontal direction orthogonal to the vertical direction Dv. The width direction Dw is a direction orthogonal to the axial direction Da in the horizontal direction, and is a direction in which the pair of main frame portions 11 is separated from each other.

The pair of connection portions 12 extends in the width direction Dw. The pair of connection portions 12 connects both end portions of the pair of main frame portions 11 in the axial direction Da provided to be separated from each other.

As shown in FIGS. 2 and 3, each of the pair of main frame portions 11 includes an outer frame member (first square tubular member) 13 and an inner frame member (second square tubular member) 14.

Each outer frame member 13 is positioned on an outer side of the main frame portion 11 in the width direction Dw. The outer frame member 13 has a rectangular tubular shape. Specifically, the outer frame member 13 of the present embodiment is formed of a square tubular steel material having a rectangular cross section extending the axial direction Da. The outer frame member 13 includes an outer upper wall portion 13a, an outer lower wall portion 13b, an outer first side wall portion 13c, and an outer second side wall portion 13d, as side wall portions.

The outer upper wall portion 13a is a plate member, which faces upward in the vertical direction Dv, in the side wall portions. The outer upper wall portion 13a is provided above the base B in the vertical direction Dv so as to be separated from the base B.

The outer lower wall portion 13b is a plate member, which faces downward in the vertical direction Dv, in the side wall portions. The outer lower wall portion 13b is provided below the outer upper wall portion 13a in the vertical direction Dv so as to be separated from the outer upper wall portion 13a. The outer lower wall portion 13b of the present embodiment is provided above the base B at an interval in the vertical direction Dv.

The outer first side wall portion 13c is a plate member, which faces the outer side in the width direction Dw, in the side wall portions. The outer first side wall portion 13c connects the outer upper wall portion 13a and the outer lower wall portion 13b to each other outside the outer upper wall portion 13a and the outer lower wall portion 13b in the width direction Dw. As shown in FIGS. 1 to 3, an opening portion 18 which communicates with the inside and the outside of the outer frame member 13 is formed in the outer first side wall portion 13c at a position corresponding to a position at which the outer jack member 30 described later is provided.

The opening portion 18 is open so as to have a rectangular shape. The opening portion 18 is opened with a size that allows an operator to insert a hand. A plurality of (two in the present embodiment) opening portions 18 are formed to be separated from each other in the axial direction Da.

The outer second side wall portion 13d is a plate member, which faces the inner side in the width direction Dw, in the side wall portions. The outer second side wall portion 13d is provided inside the outer first side wall portion 13c to be separated from the outer first side wall portion 13c in the width direction Dw. The outer second side wall portion 13d connects the outer upper wall portion 13a and the outer lower wall portion 13b to each other inside the outer upper wall portion 13a and the outer lower wall portion 13b in the width direction Dw.

The outer frame member 13 is formed in a rectangular tubular shape when viewed in the width direction Dw by four side wall portions of the outer upper wall portion 13a, the outer lower wall portion 13b, the outer first side wall portion 13c, and the outer second side wall portion 13d.

The inner frame member 14 is located inside in the width direction Dw, in the main frame portion 11. The inner frame member 14 is formed in a rectangular tubular shape having the same cross-sectional area as that of the outer frame member 13. Specifically, the inner frame member 14 of the present embodiment is formed of a square tubular steel material having a rectangular cross section and extending the axial direction Da. The inner frame member 14 is made of a steel material and is shorter than that of the outer frame member 13. The inner frame member 14 includes an inner upper wall portion 14a, an inner lower wall portion 14b, an inner first side wall portion 14c, and an inner second side wall portion 14d, as side wall portions.

The inner upper wall portion 14a is a plate member, which faces upward in the vertical direction Dv, in the side wall portions. The inner upper wall portion 14a is provided above the base B in the vertical direction Dv so as to be separated from the base B. The inner upper wall portion 14a is disposed to be positioned at the same position as the position of the outer upper wall portion 13a in the vertical direction Dv.

The inner lower wall portion 14b is a plate member, which faces downward in the vertical direction Dv, in the side wall portions. The inner lower wall portion 14b is provided below the inner upper wall portion 14a to be separated from the inner upper wall portion 14a in the vertical direction Dv. The inner lower wall portion 14b of the present embodiment is provided above the base B at an interval in the vertical direction Dv. The inner lower wall portion 14b is disposed to be positioned at the same position as the position of the outer lower wall portion 13b in the vertical direction Dv.

The inner first side wall portion 14c is a plate member, which faces the outer side in the width direction Dw, in the side wall portions. The inner first side wall portion 14c connects the inner upper wall portion 14a and the inner lower wall portion 14b to each other outside the inner upper wall portion 14a and the inner lower wall portion 14b in the width direction Dw. The inner first side wall portion 14c is disposed at a position at which the inner first side wall portion 14c is in contact with the outer second side wall portion 13d. The inner first side wall portion 14c and the outer second side wall portion 13d are welded to each other so as to be integrated with each other. Accordingly, the outer frame member 13 and the inner frame member 14 are connected to each other so as to be one member.

The inner second side wall portion 14d is a plate member, which faces the inner side in the width direction Dw, in the side wall portions. The inner second side wall portion 14d is provided inside the outer first side wall portion 14c to be separated from the inner first side wall portion 14c in the width direction Dw. The inner second side wall portion 14d connects the inner upper wall portion 14a and the inner lower wall portion 14b to each other inside the inner upper wall portion 14a and the inner lower wall portion 14b in the width direction Dw.

The inner frame member 14 is formed in a rectangular tubular shape when viewed in the width direction Dw by four side wall portions of the inner upper wall portion 14a, the inner lower wall portion 14b, the inner first side wall portion 14c, and the inner second side wall portion 14d.

According to the configurations of the outer frame member 13 and the inner frame member 14 described above, each main frame portion 11 includes an upper plate section 15, a lower plate section 16, and a connection section 17.

The supporting column 20 comes into contact with the upper plate section 15 so as to be fixed to the upper plate section 15. The upper plate section 15 of the present embodiment includes the outer upper wall portion 13a and the inner upper wall portion 14a.

The lower plate section 16 is provided below the upper plate section 15 in the vertical direction Dv at an interval.

The lower plate section 16 of the present embodiment includes the outer lower wall portion 13b and the inner lower wall portion 14b.

The connection section 17 is provided at a position overlapping the supporting column 20 when viewed in the vertical direction Dv. That is, the connection section 17 is disposed immediately below the supporting column 20 in the vertical direction Dv. The connection section 17 connects the upper plate section 15 and the lower plate section 16 to each other. The connection section 17 is constituted by mutually facing side wall portions of the outer frame member 13 and the inner frame member 14. The connection section 17 of the present embodiment includes the outer first side wall portion 13c and the inner second side wall portion 14d.

As shown in FIGS. 2 and 3, the supporting column 20 is provided on each main frame portion 11 and extends upward in the vertical direction Dv. The supporting column 20 supports a support leg (supporting target portion) 4g provided on the compressor 4 described later. The supporting column 20 of the present embodiment is a rectangular columnar steel member. A plurality of (two in the present embodiment) supporting columns 20 are provided to be separated from each other in the axial direction Da with respect to the compressor 4. A plurality of (two in the present embodiment) supporting columns 20 are provided to be separated from each other in the width direction Dw such that the compressor 4 is interposed therebetween. Here, when viewed in the vertical direction Dv, each supporting column 20 is provided at a position at which the position of the supporting column 20 in the width direction Dw overlaps the connection section 17 extending in the axial direction Da. That is, the main frame portion 11 is disposed immediately below the connection section 17 in the vertical direction Dv. A lower end portion of each supporting column 20 is joined to the upper plate section 15 of the main frame portion 11 by a bolt, welding, or the like. The support leg 4g of the compressor 4 is placed on an upper end portion of each supporting column 20.

Flange portions 4f and 4f protruding toward both sides in the width direction Dw are integrally formed with a casing 4a of the compressor 4. The support leg (supporting target portion) 4g which extends outward and downward in the width direction Dw is provided in each flange portion 4f. The support leg 4g is placed on an upper end portion of the supporting column 20. Accordingly, the compressor 4 is supported by the supporting columns 20.

As shown in FIG. 3, the outer jack member 30 supports the main frame portion 11 on the base B. The outer jack member 30 can adjust a height of the main frame portion 11 with respect to the base B. Accordingly, the outer jack member 30 supports the support frame 10 on the base B in a state where the height position can be adjusted. The outer jack member 30 is disposed outside the connection section 17 in the width direction Dw. The outer jack member 30 supports the outer frame member 13. The outer jack member 30 of the present embodiment is provided outside the supporting column 20 in the width direction Dw. The outer jack member 30 can support the support frame 10 on the base B alone even when the inner jack member 40 is not provided. When viewed from above in the vertical direction Dv, preferably, the position of the outer jack member 30 in the vertical direction Dv overlaps the position overlapping the supporting column 20. The outer jack member 30 includes an outer fixing member 31, an outer jack bolt 32, and an outer abutment plate 33.

The outer fixing member 31 has a plate shape. The outer fixing member 31 is disposed inside the outer frame member 13. The outer fixing member 31 is fixed to the outer lower wall portion 13b by welding. A female screw hole (not shown) is formed in the outer fixing member 31. In addition, a through-hole (not shown) through which the outer jack bolt 32 passes is formed in the outer lower wall portion 13b of the outer frame member 13 at a position immediately below the female screw hole (not shown) in the vertical direction.

The outer jack bolt 32 can adjust the position of the outer fixing member 31 in the vertical direction Dv, and thus, can adjust the height of the support frame 10 with respect to the base B. The outer jack bolt 32 integrally includes a shaft portion 32b which has an outer peripheral surface on which screw grooves are formed and a head portion 32a (outer operating portion) which is provided on one end of the shaft portion 32b.

The shaft portion 32b is screwed to the female screw hole (not shown) of the outer fixing member 31. The shaft portion 32b passes through the through-hole (not shown) of the outer lower wall portion 13b so as to extend toward the lower side of the outer lower wall portion 13b.

The head portion 32a is used by an operator to adjust the height of the support frame 10. The head portion 32a is provided inside the outer frame member 13 which communicates with the outside via the opening portion 18. That is, the head portion 32a of the present embodiment is positioned in a space between the outer upper wall portion 13a and the outer lower wall portion 13b of the outer frame member 13. The head portion 32a is disposed such that the operator can turn a tool or the like from the outside of the main frame portion 11 in the width direction Dw through the opening portion 18 formed on the outer first side wall portion 13c using an operator's hand.

The outer abutment plate 33 is provided such that a tip of the outer jack bolt 32 abuts against the base B.

By turning the head portion 32a of the outer jack bolt 32, a protrusion dimension of the outer jack member 30 downward from the outer lower wall portion 13b is adjusted, and a level (height) of the main frame portion 11 with respect to the base B can be adjusted.

The inner jack member 40 supports the main frame portion 11 on the base B. The inner jack member 40 can adjust the height of the main frame portion 11 with respect to the base B. Accordingly, the inner jack member 40 supports the support frame 10 on the base B together with the outer jack member 30 in a state capable of adjusting the height position. The inner jack member 40 is disposed inside the outer jack member 30 in the width direction Dw. The inner jack member 40 is disposed inside the connection section 17 in the width direction Dw. The inner jack member 40 supports the inner frame member 14. The inner jack member 40 of the present embodiment is provided inside the supporting column 20 in the width direction Dw. When viewed from above in the vertical direction Dv, preferably, the inner jack member 40 is provided at a position close to the supporting column 20. When viewed from above in the vertical direction Dv, more preferably, the inner jack member 40 is provided at a position at which the position of the inner jack member 40 in the vertical direction Dv overlaps the supporting column 20. The inner jack member 40 includes an inner fixing member 41, an inner jack bolt 42, and an inner abutment plate 43.

The inner fixing member 41 has a plate shape. The inner fixing member 41 is disposed on the inner upper wall portion 14a. The inner fixing member 41 is fixed to the inner upper wall portion 14a by welding. A female screw hole (not shown) is formed in the inner fixing member 41. In addition, a through-hole (not shown) through which the inner jack bolt 42 passes is formed in each of the inner upper wall portion 14a and the inner lower wall portion 14b of the inner frame member 14 at a position immediately below the female screw hole (not shown) in the vertical direction.

The inner jack bolt 42 can adjust the position of the inner fixing member 41 in the vertical direction Dv, and thus, can adjust the height of the support frame 10 in the vertical direction Dv with respect to the base B. The inner jack bolt 42 integrally includes a shaft portion 42b which has an outer peripheral surface on which screw grooves are formed and a head portion 42a (inner operating portion) which is provided on one end of the shaft portion 42b.

The shaft portion 42b is screwed to the female screw hole (not shown) of the inner fixing member 41. The shaft portion 42b passes through the through-holes (not shown) of the inner upper wall portion 14a and the inner lower wall portion 14b so as to extend toward the lower side of the inner lower wall portion 14b.

The head portion 42a is used by an operator to adjust the height of the support frame 10. The head portion 42a is provided above the upper plate section 15 in the vertical direction Dv. That is, the head portion 42a of the present embodiment is provided above the inner upper wall portion 14a. The head portion 42a is provided such that the operator can turn the head portion 42a above the inner frame member 14 using a tool or the like.

The inner abutment plate 43 is provided such that the tip of the inner jack bolt 42 abuts against the base B.

By turning the head portion 42a of the inner jack bolt 42, a protrusion dimension of the inner jack member 40 downward from the inner lower wall portion 14b is adjusted, and the level (height) of the main frame portion 11 with respect to the base B can be adjusted.

A portion between the main frame portion 11 and the base B is filled with the grout material 50, and thus, a load of the main frame portion 11 is supported. The grout material 50 includes mortar concrete or the like. In a state where the level of the main frame portion 11 is adjusted by the outer jack member 30 and the inner jack member 40, the filling of the grout material 50 is performed and the grout material 50 is cured.

In addition, each anchor member 60 fixes the position of the main frame portion 11 with respect to the base B before the filling of the grout material 50 is performed. That is, the anchor member 60 fixes the position of the main frame portion 11 whose level is adjusted by the outer jack member 30 and the inner jack member 40. For example, in the main frame portion 11, the anchor member 60 is disposed at a position, which does not interfere with the outer jack member 30, inside the outer frame member 13 accessible from the opening portion 18. The anchor member 60 extends downward through the outer lower wall portion 13b of the outer frame member 13 and is driven into the base B.

Figure 4:
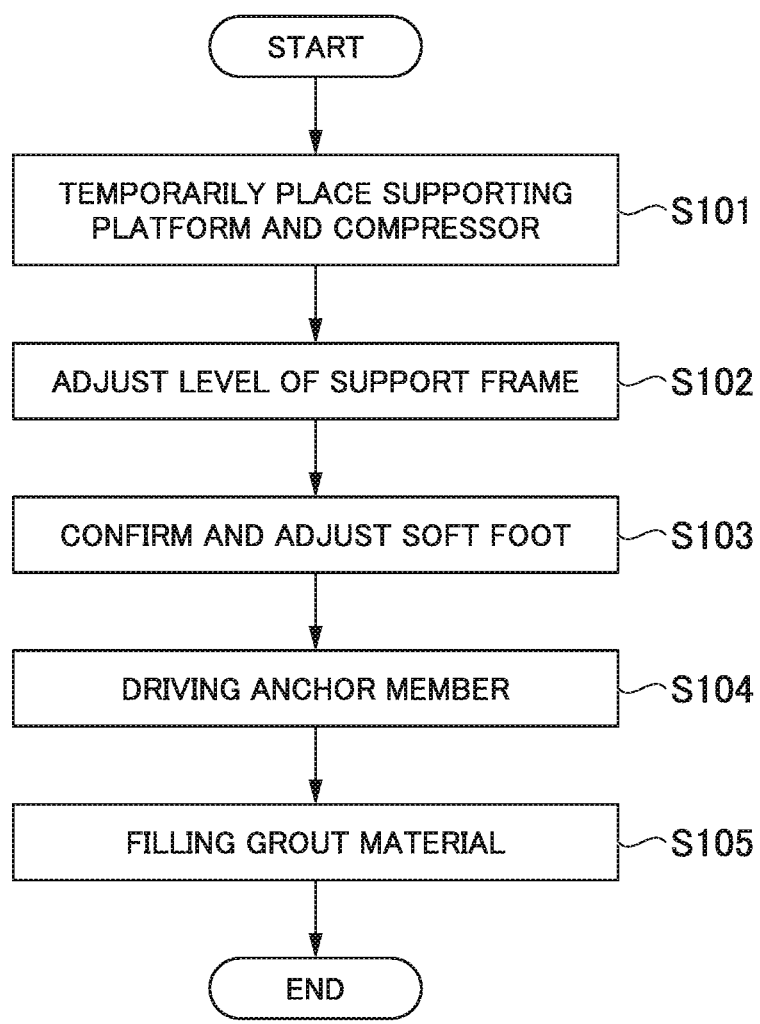
FIG. 4 is a flowchart showing a flow of a method for manufacturing the compressor system in the embodiment.
Figure 5:
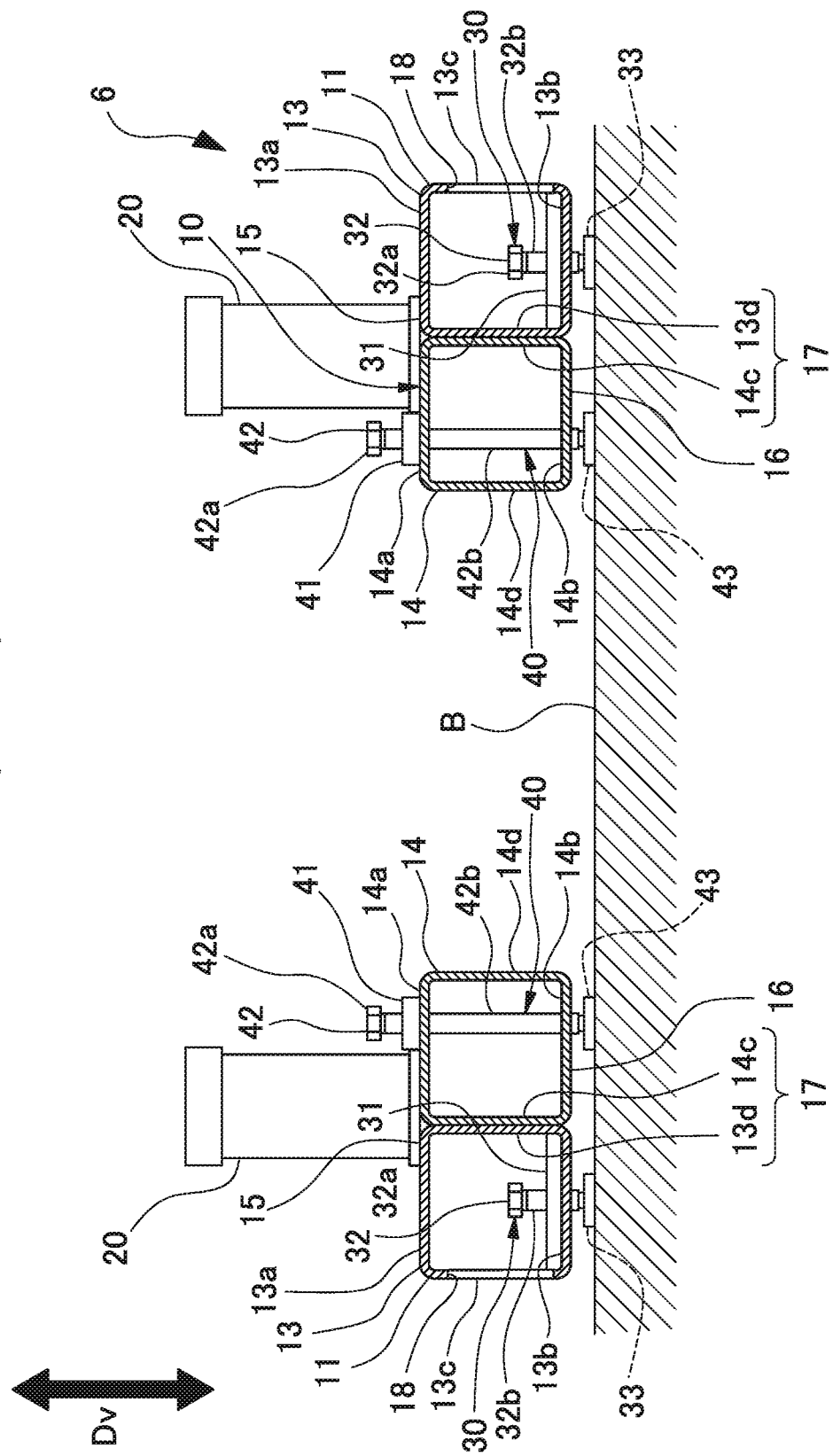
FIG. 5 is a view showing the flow of the method for manufacturing the compressor system in the embodiment of the present invention and is a sectional view showing a state where a support frame is supported by an outer jack member and an inner jack member.
Figure 6:
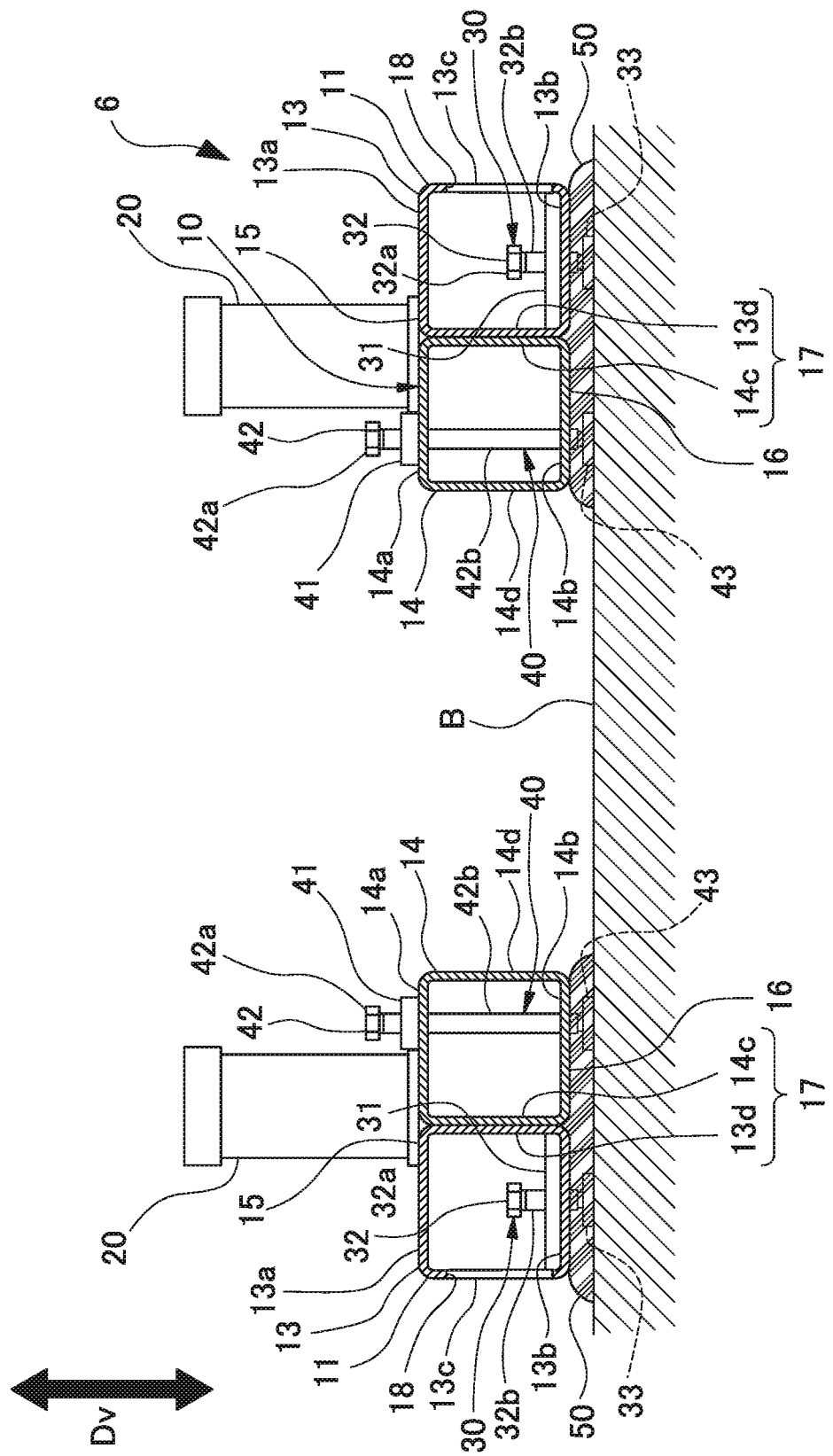
FIG. 6 is a view showing the flow of the method for manufacturing the compressor system in the embodiment of the present invention and is a sectional view showing a state where a portion between the support frame and a base is filled with a grout material.

FIG. 4 is a flowchart showing a flow of a method for manufacturing the compressor system in the embodiment. FIG. 5 is a view showing the flow of the method for manufacturing the compressor system in the embodiment of the present invention and is a sectional view showing a state where the support frame is supported by the outer jack member and the inner jack member. FIG. 6 is a view showing the flow of the method for manufacturing the compressor system in the embodiment of the present invention and is a sectional view showing a state where a portion between the support frame and a base is filled with a grout material.

Next, the method for manufacturing the compressor system 1 having the above-described configuration will be described with reference to FIG. 4. As shown in FIG. 4, the supporting platform 6 which is assembled in a state where the compressor 4 is placed is temporarily placed on the base B (Step S101). Specifically, the support frame 10 is assembled in advance. The pair of main frame portions 11 and the pair of connection portions 12 are assembled and welded to each other such that the support frame 10 has a rectangular frame shape in plan view when viewed from above in the vertical direction Dv. Next, each supporting column 20 is attached to the upper plate section 15 by welding. In addition, the outer jack members 30 and the inner jack members 40 are attached at predetermined locations of each of the pair of main frame portions 11 of the support frame 10. In this way, the driving machine 2 and the compressor 4 are placed on the assembled supporting platform 6 and the supporting platform 5 and are temporarily placed on the base B.

In addition, the assembly of the support frame 10 or the attachment of each supporting column 20 may be performed on the base B which is an installation site of the compressor system 1, or after the support frame 10 is assembled in a factory or the like, the assembled support frame 10 may be conveyed to the installation site. In addition, after the support frame 10 is temporarily placed on the base B, each supporting column 20 may be fixed to the upper plate section 15.

Next, as shown in FIG. 5, the level adjustment (adjustment of the height position of the upper plate section 15 with respect to the base B in the vertical direction Dv) of the support frame 10 is performed by each outer jack member 30 and each inner jack member 40 (Step S102). Specifically, each outer jack bolt 32 and each inner jack bolt 42 are rotated by a tool, and thus, the height position of the upper plate section 15 in the vertical direction Dv with respect to the base B is adjusted. In this case, the height adjustment of each main frame portion 11 is adjusted by the outer jack member 30 provided outside the supporting column 20 in the width direction Dw and the inner jack member 40 provided inside the supporting column 20 in the width direction Dw, and thus, a horizontal level adjustment of the entire main frame portion 11 can be performed. In addition, the level adjustment with respect to each of the pair of main frame portions 11 is performed, and thus, it is possible to perform the level adjustment of the entire support frame 10.

After the level adjustment of the entire support frame 10 is performed, a gap (soft foot) between a lower end portion of the support leg 4g of the compressor 4 supported on each supporting column 20 and an upper end portion of the supporting column 20 is confirmed and adjusted (Step S103). Specifically, the height of the inner side of each main frame portion 11 in the width direction Dw with respect to the supporting column 20 is adjusted by the inner jack members 40. Accordingly, there is no gap between the lower end portion of the support leg 4g of the compressor 4 and the upper end portion of the supporting column 20.

Next, as shown in FIG. 4, the position of the supporting platform 6 is fixed to the base B by each anchor member 60 (Step S104). Specifically, as shown in FIG. 3, each anchor member 60 is driven into the base B through the outer lower wall portion 13b of the outer frame member 13, and the positions of the pair of main frame portions 11 with respect to the base B are fixed.

Thereafter, as shown in FIG. 6, the gap between the support frame 10 and the base B is filled with the grout material 50 in a fluid state (Step S105). The filling grout material 50 is cured to exert predetermined strength, and the load of the support frame 10 is supported by the outer jack members 30, the inner jack members 40, and the grout material 50. Thereafter, the supporting platform 5 on which the driving machine 2 is installed by a similar method and the supporting platform 6 are connected to each other. Accordingly, the compressor system 1 is obtained.

According to the above-described embodiment, the outer jack member 30 is provided outside the connection section 17 in the width direction Dw and the inner jack member 40 is installed inside the connection section 17 in the width direction Dw. The load of the compressor 4 applied to the upper plate section 15 via the position at which the supporting column 20 is provided separately acts on the outer jack member 30 and the inner jack member 40. Accordingly, by the outer jack member 30 and the inner jack member 40, it is possible to support the upper plate section 15 on which the load acts from both sides in the width direction Dw with respect to the supporting column 20. As a result, unlike a case where the inner jack member 40 is not provided, it is possible to prevent the inner side of the main frame portion 11 in the width direction Dw from being lowered by the load of the compressor 4 and being inclined. Accordingly, the supporting column 20 provided on the main frame portion 11 is prevented from being inclined. Accordingly, it is possible to prevent the gap (soft foot) between the lower end portion of the support leg 4g of the compressor 4 supported on the supporting column 20 and the upper end portion of the supporting column 20 from being generated. Accordingly, it is possible to prevent a gap between the support leg 4g of the compressor 4 supported on the supporting column 20 and the supporting column 20 from being generated without increasing stiffness of the main frame portion 11 itself. Accordingly, it is possible to install the compressor 4 constituting the compressor system 1 with high accuracy while suppressing an increase in the cost of the supporting platform 6.

The height adjustment of each main frame portion 11 is performed by the outer jack member 30 and the inner jack member 40 provided on both sides of the width direction Dw in the state where the connection section 17 is interposed therebetween. Therefore, as the main frame portion 11 alone or the entire supporting platform 6, the level adjustment with respect to the position at which supporting column 20 is installed can be easily performed with high accuracy.

In addition, the connection section 17 is provided immediately below the supporting column 20 in the vertical direction Dv. The load of the compressor 4 applied to the upper plate section 15 via the supporting column 20 is supported by the connection section 17. Accordingly, it is possible to reliably support the load of the compressor 4 by the main frame portion 11.

The head portion 42a of the inner jack bolt 42 of the inner jack member 40 disposed inside the supporting column 20 is exposed above the upper plate section 15. Accordingly, in a case where the height of the main frame portion 11 is adjusted by the inner jack member 40, it is possible to easily rotate the head portion 42a of the inner jack member 40 positioned inside the supporting column 20. Accordingly, it is possible to easily perform the height adjustment of the main frame portion 11 by the inner jack member 40.

In addition, when viewed in the vertical direction Dv, the inner jack member 40 is provided such that the position of the inner jack member 40 in the axial direction Da is close to the position overlapping the position of the supporting column 20 in the axial direction Da. Accordingly, the load of the compressor 4 received by the upper plate section 15 via the supporting column 20 can be accurately received by the portion supported by the inner jack member 40. As a result, it is possible to accurately prevent the main frame portion 11 from being inclined.

In addition, the main frame portion 11 is constituted by the outer frame member 13 and the inner frame member 14, and thus, it is possible to form the main frame portion 11 by a square tubular steel material. Accordingly, it is possible to manufacture the supporting platform 6 while decreasing costs.

In addition, in the supporting platform 6, the portion between the main frame portion 11 and the base B is filled with the grout material 50. Accordingly, it is possible to fix the position of the main frame portion 11, of which the height and horizontal level are adjusted by the outer jack member 30 and the inner jack member 40, with respect to the base B.

Modification Example of Embodiment

Figure 7:
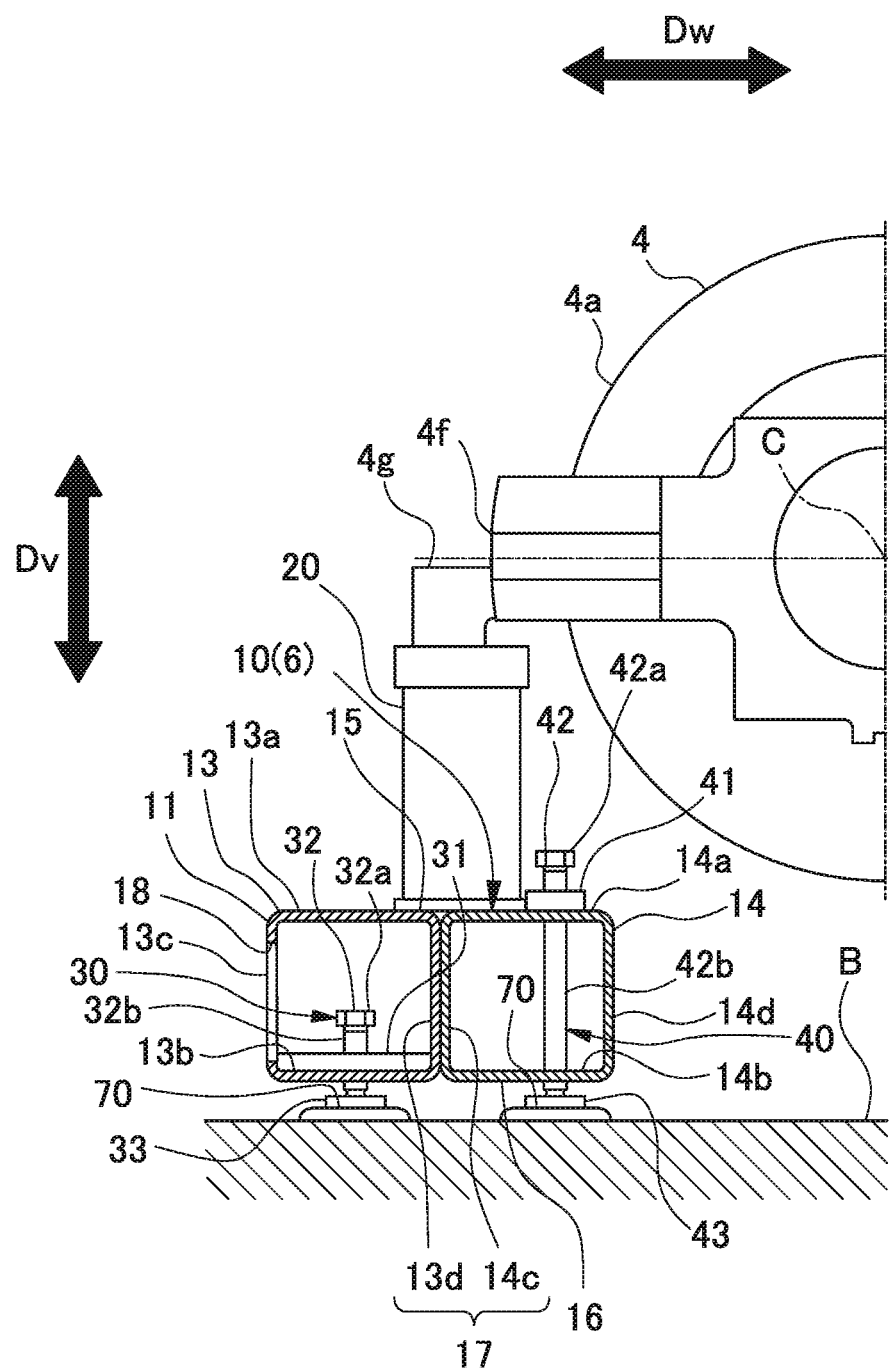
FIG. 7 is a sectional view showing a modification example of the supporting platform in the embodiment of the present invention.

In the above-described embodiment, the lower ends of the outer jack member 30 and the inner jack member 40 are grounded on the base B. However, the present invention is not limited to this. For example, as shown in FIG. 7, a pedestal portion 70 protruding upward from the base B may be provided on the base B. In this case, the lower ends of the outer jack member 30 and the inner jack member 40 are grounded on the pedestal portion 70.

Other Embodiments

Hereinbefore, the embodiments of the present invention are described above in detail with reference to the drawings. However, the respective configurations and combinations thereof in each embodiment are merely examples, and additions, omissions, replacements, and other modifications of configurations are possible within the scope not departing from the gist of the present invention. In addition, the present invention is not limited by the embodiments, but is limited only by claims.

For example, the opening portion 18 may be continuously provided in the longitudinal direction of the outer frame member 13 of the main frame portion 11.

In addition, in the outer jack member 30, the head portion 32a of the outer jack bolt 32 is positioned inside the outer frame member 13. However, similarly to the inner jack member 40, the head portion 32a may be positioned above the outer upper wall portion 13a of the outer frame member 13.

Moreover, in the inner jack member 40, the head portion 42a of the inner jack bolt 42 is positioned above the inner upper wall portion 14a. However, similarly to the outer jack member 30, the head portion 42a may be positioned inside the inner frame member 14. In this case, preferably, an opening is provided on the inner second side wall portion 14d of the inner frame member 14.

In addition, the square tubular shaped outer frame member 13 and inner frame member 14 are joined to each other, and thus, the main frame portion 11 is configured. However, the present invention is not limited to this. For example, a so-called H-shaped steel can be used for the main frame portion 11. In this case, an upper flange of the H-shaped steel may be an upper plate section, a lower flange thereof may be a lower plate section, and a web which connects the upper flange and the lower flange to each other may be a connection section.

In addition, as described above, the compressor 4 is supported on the above-described supporting platform 6. However, a configuration similar to that of the supporting platform 6 can be also applied to the supporting platform 5 supporting the driving machine 2. Moreover, the supporting platform, the rotating machine unit, the method for manufacturing a rotating machine unit of the present invention are not limited to the compressor 4, and can be similarly applied to various rotating machines such as a turbine or a motor.

INDUSTRIAL APPLICABILITY

According to the above-descried supporting platform 6, it is possible to install the rotating machine with high accuracy.

REFERENCE SIGNS LIST

1: compressor system (rotating machine unit)
2: driving machine
3: drive shaft
4: compressor (rotating machine)
4a: casing
4f: flange portion
4g: support leg (supporting target portion)
5: supporting platform
6: supporting platform
10: support frame
11: main frame portion (supporting body)
12: connection portion
13: outer frame member
13a: outer upper wall portion
13b: outer lower wall portion
13c: outer first side wall portion
13d: outer second side wall portion
14: inner frame member
14a: inner upper wall portion
14b: inner lower wall portion
14c: inner first side wall portion
14d: inner second side wall portion
15: upper plate section
16: lower plate section
17: connection section
18: opening portion
20: supporting column
30: outer jack member (outer adjustment member)
31: outer fixing member
32: outer jack bolt
32a: head portion (outer operating portion)
32b: shaft portion
33: outer abutment plate
40: inner jack member (inner adjustment member)
41: inner fixing member
42: inner jack bolt
42a: head portion (inner operating portion)
42b: shaft portion
43: inner abutment plate
50: grout material (curable filler)
60: anchor member
70: pedestal portion
B: base
C: central axis
Dw: width direction (separation direction)
Dv: vertical direction
Da: axial direction

The invention claimed is:

1. A supporting platform which supports a rotating machine on a base, comprising:
a pair of supporting bodies which is provided on the base to be separated from each other in a horizontal direction;
a supporting column which is provided on each supporting body of the pair of supporting bodies, extends upward in a vertical direction, and supports a supporting target portion provided in the rotating machine;
an outer adjustment member which supports each supporting body on the base and adjusts a height of each supporting body with respect to the base; and
an inner adjustment member which is disposed inside the outer adjustment member in a separation direction of the pair of supporting bodies, supports each supporting body on the base, and adjusts the height of each supporting body with respect to the base,
wherein each supporting body includes
an upper plate section to which the supporting column is fixed,
a lower plate section which is provided below the upper plate section in the vertical direction at an interval, and
a connection section which is provided at a position overlapping the supporting column when viewed in the vertical direction and connects the upper plate section and the lower plate section to each other,
wherein the outer adjustment member is disposed outside the connection section in the separation direction, and
wherein the inner adjustment member is disposed inside the connection section in the separation direction.

2. The supporting platform according to claim 1,
wherein the inner adjustment member includes an inner operating portion for adjusting the height of each supporting body, and
wherein the inner operating portion is provided above the upper plate section in the vertical direction.

3. The supporting platform according to claim 2,
wherein the inner adjustment member is provided at a position where a position of the rotating machine in an axial direction in which a rotating shaft extends overlaps the supporting column.

4. The supporting platform according to claim 3,
wherein each supporting body includes a first square tubular member having a rectangular tubular shape and a second square tubular member which is disposed inside the first square tubular member in the separation direction and has a rectangular tubular shape,
wherein the connection section includes mutually facing side wall portions of the first square tubular member and the second square tubular member,
wherein the outer adjustment member supports the first square tubular member, and
wherein the inner adjustment member supports the second square tubular member.

5. The supporting platform according to claim 2,
wherein each supporting body includes a first square tubular member having a rectangular tubular shape and a second square tubular member which is disposed inside the first square tubular member in the separation direction and has a rectangular tubular shape,
wherein the connection section includes mutually facing side wall portions of the first square tubular member and the second square tubular member, wherein the outer adjustment member supports the first square tubular member, and wherein the inner adjustment member supports the second square tubular member.

6. The supporting platform according to claim 1, wherein the inner adjustment member is provided at a position where a position of the rotating machine in an axial direction in which a rotating shaft extends overlaps the supporting column.

7. The supporting platform according to claim 1, wherein each supporting body includes a first square tubular member having a rectangular tubular shape and a second square tubular member which is disposed inside the first square tubular member in the separation direction and has a rectangular tubular shape, wherein the connection section includes mutually facing side wall portions of the first square tubular member and the second square tubular member, wherein the outer adjustment member supports the first square tubular member, and wherein the inner adjustment member supports the second square tubular member.

8. The supporting platform according to claim 7, wherein the outer adjustment member includes an outer operating portion for adjusting the height of each supporting body, wherein the first square tubular member includes an opening portion which is formed on the side wall portion facing the outside in the separation direction, and wherein the outer operating portion is provided inside the first square tubular member which communicates with the outside via the opening portion.

9. The supporting platform according to claim 1, wherein a portion between the lower plate section and the base is filled with a curable filler.

10. A rotating machine unit, comprising:

the supporting platform according to claim 1; and a rotating machine having a supporting target portion which is supported on a supporting column of the supporting platform.

11. A method for manufacturing the rotating machine unit according to claim 10, comprising:

a step of installing the rotating machine on the supporting column;

a step of adjusting a height position of the upper plate section with respect to the base in the vertical direction by the outer adjustment member and the inner adjustment member;

a step of fixing a position of the supporting platform with respect to the base by an anchor member; and a step of filling a portion between the lower plate section and the base with a curable filler after the position of the supporting platform is fixed.

* * * * *